No. 726,468. PATENTED APR. 28, 1903.
G. J. SCOTT.
PROCESS OF FORMING ACCUMULATOR ELECTRODES.
APPLICATION FILED FEB. 28, 1903.
NO MODEL.
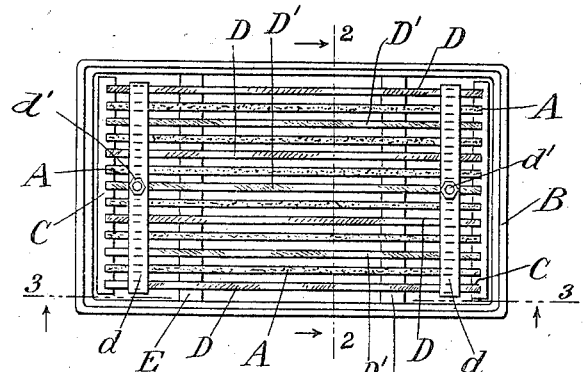
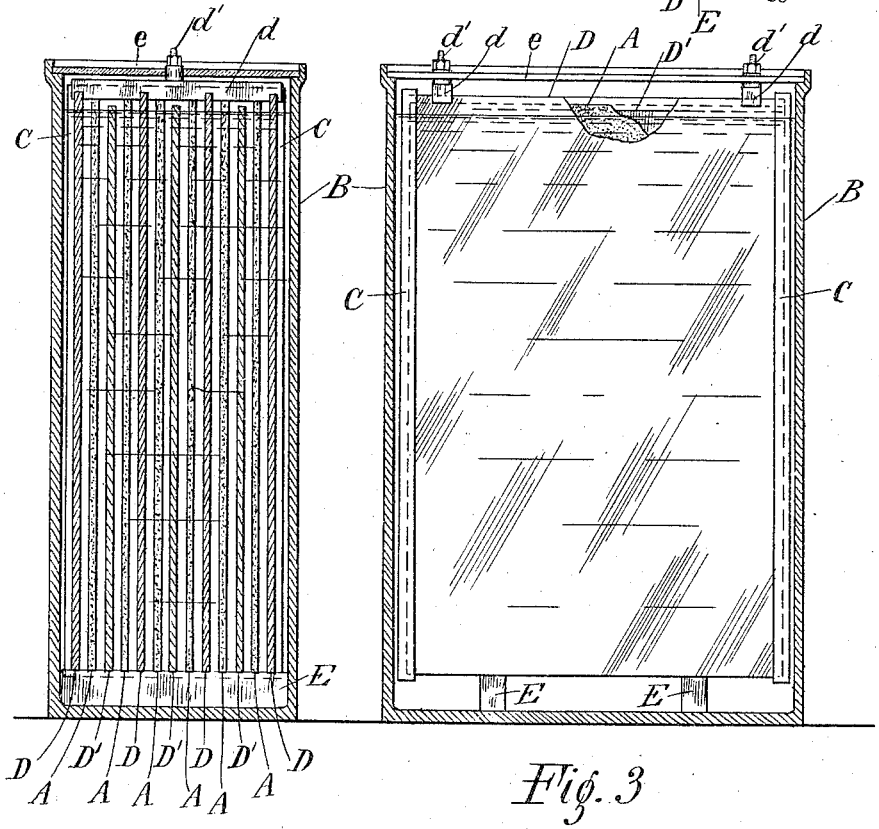
Witnesses
Ivan Konigsberg.
E. L. Benedict
Gordon J. Scott, Inventor
By his Attorney
Lyons & Rising

UNITED STATES PATENT OFFICE.

GORDON JOHN SCOTT, OF PHILADELPHIA, PENNSYLVANIA, ASSIGNOR TO CHARLES H. GRAHAM AND GEORGE D. BONTON, OF PHILADELPHIA, PENNSYLVANIA.

PROCESS OF FORMING ACCUMULATOR-ELECTRODES.

SPECIFICATION forming part of Letters Patent No. 726,468, dated April 28, 1903.

Application filed February 28, 1903. Serial No. 145,597. (No specimens.)

*To all whom it may concern:*

Be it known that I, GORDON JOHN SCOTT, a citizen of the United States, residing in the city of Philadelphia, State of Pennsylvania, have invented a new and useful Improvement in Processes of Forming Accumulator-Electrodes, of which the following is a specification.

The object of my invention is to "form" accumulator-electrodes by a process such that after the electrodes have been formed and are ready for commercial use they shall be capable of storing a much greater electrical charge per unit weight of the electrode than has heretofore been possible by the customary forming processes.

The meaning which those skilled in the art attach to the words "forming process" is clear and well defined, even though the precise chemical and electrical reactions which go on in the forming process may not be perfectly understood. The fact is that whether the accumulator is of the Plante or Faure type or is a combination of the two types it is the common practice to subject the accumulator-electrodes to a preliminary or forming operation. This preliminary or forming operation gets the accumulator-electrode ready for its commercial use—that is to say, it gets it ready to receive and store a much greater quantity of electrical energy than would be the case if the electrode had not first been formed. I need hardly add that I use the word "storing" as applied to electricity in its every-day sense as employed in the accumulator art.

In the Plante accumulator the preliminary forming process consists in passing a current through the accumulator-electrodes for a short time and then either permitting the electrodes to give off current or passing current therethrough in the opposite direction, this cycle being repeated a number of times and the length of time occupied by each cycle being increased at each repetition. In the Faure accumulator it is customary to form the electrodes by passing current therethrough in a given direction and then permitting the electrodes to give off current, this operation being repeated but a small number of times. In either case, however, the preliminary forming operation produces accumulator-electrodes which are capable of storing a far greater quantity of electrical energy than would have been the case had they not been subjected to the forming operation. It is thus seen that the forming operation is sharply differentiated from the subsequent charging and discharging of the accumulator in its actual use. The preliminary forming operation changes the mechanical and chemical condition of the electrodes into one which enables them to store a large quantity of electrical energy. The subsequent charging and discharging of the accumulator in its actual use, on the other hand, gradually disintegrates the electrodes and makes them unfit to store electrical energy.

My invention relates to a new forming process; and its object, as has been indicated above, is to devise a forming process which shall produce accumulator-electrodes that are capable of storing a greater quantity of electrical energy than can be stored by electrodes of the same weight formed by other processes.

To this end my forming process consists in separating the accumulator-electrodes during the forming operation by a current-conducting baffle or partition, which is interposed between the electrodes in such a manner that it will enable electric current to pass directly from one electrode to the adjacent electrode through the current-conducting baffle or partition and will permit the electrolyte to pass from one electrode to the other, but will compel this passage of the electrolyte to be along devious or circuitous paths.

In the drawings, Figure 1 represents a plan of the apparatus used. Fig. 2 represents a vertical section along the line 2 2 of Fig. 1. Fig. 3 is a section of the line 3 3.

The structure of the cell which is to be used in my forming process is, generically considered, the same as that described in Amwake's patent, No. 707,372, dated August 19, 1902—that is to say, there is a baffle or partition A, of current-conducting substance—such, for instance, as carbon—which is placed between the electrodes in such a manner that electric current can pass directly from one electrode to the other, whereas the electrolyte, although it is permitted to pass from one electrode to the other, is compelled to do so by seeking a circuitous path. At the same time in order that I may be enabled to subject a number of electrodes to the forming operation in one cell at the same time I have somewhat changed the mechanical construction of the parts as indicated in the drawings. I prefer, in fact, in carrying out my new forming process to use a large cell or trough B, at each end of which I place a spacing-wall C, made of electrically-insulating material and containing a number of grooves C'. Spaced apart and held in fixed relative positions by the grooves C' of this spacing-wall C are my current-conducting baffles or partitions A. Between each adjacent two of the current-conducting baffles I place the accumulator-electrodes D or D', and I have used the letter D to designate the negative accumulator-electrodes and the letter D' to designate the positive accumulator-electrodes. The several negative electrodes D are electrically connected by casting thereon an electrically-conducting bridge-piece $d$, to which bridge-piece the negative terminal $d'$ is connected in any suitable manner. A similar bridge-piece electrically connects the positive accumulator-electrodes. These conducting bridge-pieces are those commonly used in electrical accumulators employing a large number of electrodes connected in parallel circuit. A top $e$ (not shown in Fig. 1) is employed to prevent splashing.

The spacing-walls C, together with the current-conducting partitions A, and the positive and negative electrodes D' D, with their bridge-pieces and terminals, together constitute a structure which is placed in the cell or trough B, but is held above the bottom of the cell by the ribs E. In this manner it will be seen that the electric current or part of it may pass directly from one electrode to the electrode adjacent thereto by going through the current-conducting baffle or partition. The electrolyte, on the other hand, although it is permitted to pass from one electrode to the other, must pass in a circuitous path from the spaces between the baffles and electrodes either along the bottom of the cell under the baffles or along the top of the cell over the baffles.

It is to be noted at this point that it is important to have the baffle imperforate, so that none of the electrolyte shall be permitted to pass directly from one electrode to the other, as would be the case if there were apertures through the baffle. The utility of my process, in fact, decreases very rapidly if the baffles employed in its execution are supplied with even small perforations.

Such being the structure of the apparatus which I employ, my preliminary or forming process will be readily understood. The electrodes D D' are the same as those now in common commercial use—that is to say, they are made of lead or other substances, as copper, palladium, &c.—and they may be supplied with active material, such as red lead and litharge, as in the Faure type of cell, or with other appropriate active materials when other types of accumulators are employed. In the forming operation I pass the preliminary or forming current from one of the terminals of the cell which I have just described through the electrolyte and the baffle or baffles to the other terminal of the cell, and after the lapse of a certain period of time the further passage of current is stopped and the cell is either permitted to discharge or has current passed through it in the reverse direction. This cycle of operations is repeated a number of times sufficient to properly form the electrodes, when the electrodes will be found to be in condition for commercial use—that is, to store electrical energy by being charged and discharged. Except for the interposition of the current-conducting baffle all this is in accordance with the usual practice. The peculiarity about my forming process, however, consists in this, that whereas in the old forming processes electrically non-conducting and perforated partitions have been used between the electrodes I use a conducting-partition, and the remarkable fact is that by this change in the forming process I produce accumulator-electrodes of increased storage capacity.

The current-conducting baffle which has been described throughout this specification has, as stated above, been heretofore used in the normal operation of primary and secondary batteries. When used in secondary batteries, it has been peculiarly efficient in the charging and discharging operation in decreasing the internal resistance of the battery, in preventing local action, and in increasing the ratio of electrical energy discharged to the electrical energy charged—that is, in increasing the efficiency of the battery. I have discovered that by utilizing this current-conducting baffle, not in the process of charging and discharging the accumulator in its ordinary commercial use, but in the original process of forming the electrodes, I produce a result not hitherto produced—namely, an accumulator-electrode which has a greater storage capacity per unit of weight than would otherwise be the case.

In the ordinary forming processes it is necessary to use a comparatively low voltage for the forming-current, which voltage is increased very gradually as the plate is being formed. In my forming process I am enabled to use somewhat higher voltages for the forming-current and to increase these voltages somewhat more rapidly without injurious effect on the electrodes under formation and without undue heat or energy losses. Additionally, my forming process produces a formed electrode which is more dense and smooth, and therefore better adapted for subsequent use than those produced by the old forming processes.

I have described my process as carried out in an apparatus in which several positive and several negative accumulator-electrodes are formed simultaneously; but manifestly I may use my process to form one or more positive electrodes only or to form one or more negative electrodes only. In this case there would be contained in the forming-cell one or more electrodes of a given sign which were being formed and one or more opposed electrodes of the opposite sign which were not being formed, but which merely supplied the electrochemical conditions necessary to the formation of the first-mentioned electrodes. My claims are to be construed as covering both forms.

I claim—

1. The process of "forming" an accumulator-electrode which consists in separating it from the opposed electrode during the "forming" operation by a current-conducting baffle, substantially as described.

2. The process of "forming" an accumulator-electrode which consists in passing the "forming" current through a cell containing the electrode to be "formed" and an opposed electrode separated therefrom by a current-conducting baffle, substantially as described.

3. The process of "forming" an accumulator-electrode, which consists in separating it during the "forming" operation, from the opposed electrode by a current-conducting baffle which enables electric current to pass directly through the baffle from one electrode to the other and the electrolyte to pass between the electrodes along circuitous paths only, substantially as described.

4. The process of "forming" an accumulator-electrode composed of lead and active material which consists in separating it during the "forming" process from the opposed electrode by a current-conducting baffle, substantially as described.

5. The process of "forming" an accumulator-electrode composed of lead and active material which consists in passing the "forming" current through a cell containing the electrode to be "formed" and an opposed electrode separated therefrom by a current-conducting baffle, substantially as described.

In testimony whereof I have signed my name to this specification in the presence of two subscribing witnesses.

GORDON JOHN SCOTT.

Witnesses:
WATSON B. RULON,
S. SALOME BROOKE.